United States Patent
Nishimoto

[11] Patent Number: 5,898,806
[45] Date of Patent: *Apr. 27, 1999

[54] OPTICAL INTERCONNECTION CIRCUIT STRUCTURE

[75] Inventor: Hiroshi Nishimoto, Tokyo, Japan

[73] Assignee: NEC Corporation, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/772,098

[22] Filed: Dec. 20, 1996

Related U.S. Application Data

[63] Continuation of application No. 08/636,826, Apr. 23, 1996, abandoned, which is a continuation of application No. 08/478,685, Jun. 7, 1995, abandoned, which is a continuation of application No. 07/973,683, Nov. 9, 1992, abandoned.

[30] Foreign Application Priority Data

Nov. 7, 1991 [JP] Japan .................................. 3-290274

[51] Int. Cl.$^6$ ...................................................... G02B 6/30
[52] U.S. Cl. .................................. 385/49; 385/52; 385/14
[58] Field of Search .................................. 385/49, 51, 52, 385/88, 89, 90, 91, 14; 372/36, 107; 257/700, 703, 706

[56] References Cited

U.S. PATENT DOCUMENTS

| | | | |
|---|---|---|---|
| 4,005,312 | 1/1977 | Lemelson | 250/551 |
| 4,149,088 | 4/1979 | Lemelson | 250/551 |
| 4,237,474 | 12/1980 | Ladany | 385/49 |
| 4,699,449 | 10/1987 | Lam et al. | 385/49 X |
| 4,750,799 | 6/1988 | Kawachi et al. | 385/49 |
| 4,892,377 | 1/1990 | Randle | 385/39 |
| 4,904,036 | 2/1990 | Blonder | 350/96.11 |
| 5,006,920 | 4/1991 | Schafer et al. | 257/700 |
| 5,023,881 | 6/1991 | Ackerman et al. | 372/46 |
| 5,077,878 | 1/1992 | Armiento et al. | 29/25.02 |
| 5,081,520 | 1/1992 | Yoshii et al. | 257/702 |
| 5,113,404 | 5/1992 | Gaebe et al. | 372/36 |
| 5,126,813 | 6/1992 | Takahahi et al. | 257/417 |
| 5,283,446 | 2/1994 | Tanisawa | 257/433 |
| 5,450,283 | 9/1995 | Lin et al. | 257/787 X |

FOREIGN PATENT DOCUMENTS

| | | |
|---|---|---|
| 0 171 615 | 2/1986 | European Pat. Off. . |
| 2 213 957 | 8/1989 | United Kingdom . |

OTHER PUBLICATIONS

Himeno et al., "Guided–Wave Optical Gate Matrix Switch", Journal of Lightwave Technology, Jan. 1988, vol. 6, No. 1, pp. 30–35.

Henry et al., "Glass Waveguides on Silicon for Hybrid Optical Packaging", Journal of Lightwave Technology, Oct. 1989, vol. 7, No. 10, pp. 1530–1539.

Yamada et al., "Optical interconnections using a silica–based waveguide on a silicon substrate", Optical Engineering, Dec. 1989, vol. 28(12), pp. 1281–1287.

*Primary Examiner*—Hemang Sanghavi
*Attorney, Agent, or Firm*—Foley & Lardner

[57] ABSTRACT

An optical interconnection circuit structure includes a substrate, an optical waveguide path, a semiconductor optical element, and a supporting base. The supporting base may be the same material as that for the optical waveguide path, as that for the substrate, or as that for the semiconductor optical element. The supporting base has an appropriately shaped surface or surfaces which abut the semiconductor optical element and a fixing material may be used depending on the shapes of the abutting surfaces. The supporting base thus formed ensures that the semiconductor optical element is stably mounted thereon and securely fixed thereto thereby establishing optical interconnection between the optical waveguide and the semiconductor optical element in a highly efficient and very reliable manner.

14 Claims, 6 Drawing Sheets

OPTICAL INTERCONNECTION CIRCUIT STRUCTURE

This application is a continuation of application Ser. No. 08/636,826, filed Apr. 23, 1996, now abandoned, which is a continuation application of Ser. No. 08/478,685, file Jun. 7, 1995, now abandoned, which is a continuation of application Ser. No. 07/973,683, filed Nov. 9, 1992, now abandoned.

BACKGROUND OF THE INVENTION (1) Field of the Invention

The present invention relates to an optical interconnection circuit structure, and more particularly to an optical interconnection circuit structure in which semiconductor optical devices are mounted and optical waveguide circuits and formed on a common substrate.

(2) Description of the Related Art

The maximum capacity of optical communication systems is advancing and, at the same time, in pursuing high level multifunctional systems, there are strong demands for optical fiber networks which are small, of low cost, highly integrated and highly functional. This means that it is essential for the optical devices for equipment such as optical transmission equipment and optical receiving equipment to also be small, highly integrated and of low cost.

Current practices provided for optical transmission and optical receiving equipment utilize a structure whereby a lens is set up between the optical fiber and either the semiconductor light source or the semiconductor light detector and optical connection is via space. This construction involving a lens and optical connection via space is referred to as "micro-optics". In micro-optics constructions there are difficulties whereby, for example, the lens shape and the shape of the package for the semiconductor light source and the semiconductor light detector restrict how small the construction can be made. Also, in order to have an efficient joint or connection between the optical fiber and the light detector using light in space, it is necessary to align the optical axis very precisely. As this operation demands many fabrication steps in the present circumstances, the cost of this cannot be reduced. Needless to say that this is completely unsuitable for high integration of similar functions or functions of a different variety.

Recently, it has become necessary to enhance bidirectional communication systems, and it is hoped to bring these systems even into the household. At this time, to make this bidirectional communication possible, it is necessary to have an optical device with optical transmission equipment and optical receiving equipment but, if these are constructed individually, the optical transmitting and receiving apparatus is cumbersome and system propagation is hindered. Therefore, although an optical device which incorporates the two functions in one body is preferable, it is difficult to realize this with a micro-optics structure for the above mentioned reasons. With this as background, Henry et al reported their research for "Light Wave Technology" in IEEE (pp. 1530–1539 (1989)) aiming for a smaller, more highly integrated lower cost structure using optical waveguide.

A conventional optical interconnection circuit structure is shown in a schematic plan view in FIG. 1. In the structure shown therein, formed on a substrate 1 are optical waveguides 2, 2a including a splitter function circuit 7. These optical waveguides 2, 2a, a semiconductor light source and the semiconductor light detector for signal detection are respectively and directly coupled optically on the same substrate 1. In FIG. 1, a semiconductor light detector 5a for monitoring the light output from the semiconductor light source 4 is also integrated on the same substrate 1 and is optically coupled with the waveguide 2b, but even if the semiconductor light detector 5a for monitoring the light output from the semiconductor light source 4 is not present, there will still be no problems with the functioning of the transmitting and receiving equipment for bidirectional optical communication. Also, the electronic reception device (not shown) for the semiconductor light detectors 5 and 5a is integrated on the same substrate 1 but even if this electronic device is not on the same substrate, there will still be no problems with the functioning of the transmitting and receiving equipment for bidirectional optical communication. With the optical waveguide 2 as shown in FIG. 1, a small size optical transmitting and receiving device can be achieved. The optical waveguide itself is suitable for mass production using lithographic processes, thus reducing the cost of production.

The semiconductor optical element mounted on the substrate and the optical waveguide formed on the substrate are optically interconnected on the substrate. In order to connect the optical waveguide and the semiconductor optical element optically in an efficient manner in the optical interconnection circuit in which the semiconductor device is fixed to the substrate, it is necessary to adjust the optical axis of the optical waveguide and the semiconductor optical element within all three dimensions to an accuracy of within 1 $\mu$m. However, doing this demands a high level of precision when adjusting the optical axis and as this operation requires a large number of fabrication steps, costs cannot be reduced according to the present technology. Consequently, there has yet to be realized a semiconductor optical interconnection fixing means which can overcome the structural problems in a conventional means for optically connecting a semiconductor optical element placed on the substrate with an optical waveguide formed on the substrate and which is simple and yet highly efficient and reliable.

SUMMARY OF THE INVENTION

An object of the present invention is to overcome the problems existing in the conventional optical interconnection circuit structure and to provide an improved structure which optically interconnects the semiconductor optical element placed on the substrate and the optical waveguide formed on the substrate in an efficient manner and which provides a fixing means for fixing the semiconductor optical element onto the substrate in a highly efficient way while maintaining a high degree reliability.

According to one aspect of the invention, there is provided an optical interconnection circuit structure comprising:

a substrate;

an optical waveguide path formed on the substrate;

a semiconductor optical element optically connected with the optical waveguide path on the substrate; and a supporting base formed on the substrate and supporting the semiconductor optical element fixedly on said supporting base.

Further features of the invention reside in arrangements wherein the supporting base is the same material as that for the optical waveguide path; wherein the supporting base is the same material as that for the substrate; wherein the supporting base is the same material as that for the semiconductor optical element; wherein the semiconductor optical element has concave fixing surfaces shaped the same as abutting surfaces of the supporting base, the concave fixing surfaces of the semiconductor optical element being adapted to receive therein the supporting base in a fixed state; wherein the supporting base has upright members, each of the upright members having a concave portion at its surface and the fixing material being filled in the concave portion for fixing the semiconductor optical element to the supporting base; the supporting base has a plurality of upright members thereby forming gaps therebetween, the fixing material being filled in the gaps for fixing the semiconductor optical element to the supporting base; or wherein the supporting base has a plurality of upright members and each of the upright members has a contact surface at which the fixing material is applied for fixing the semiconductor optical element to the supporting base.

When use is made of the optical interconnection circuit structure according to this invention for optically connecting the semiconductor optical element and the optical waveguide formed on the same substrate, it is possible to acquire optical connection between the optical waveguide and the semiconductor element in a simple, a highly efficient and very reliable way. That is, as the supporting base is formed at a height which permits the optical waveguide path to coincide in height with an optical axis of the semiconductor optical element, it is possible to achieve highly efficient and reliable optical interconnection merely by placing the semiconductor optical element on the supporting base.

BRIEF DESCRIPTION OF THE DRAWINGS

The above and other objects, features and advantages of the present invention will be apparent from the following description of preferred embodiments of the invention explained with reference to the accompanying drawings, in which.

DESCRIPTION OF THE PREFERRED EMBODIMENTS

Now, preferred embodiments of the invention will be explained with reference to the accompanying drawings. It is to be noted that, throughout the following explanation, similar reference symbols or numerals refer to the same or similar elements in all the figures of the drawings.

Figure 1:
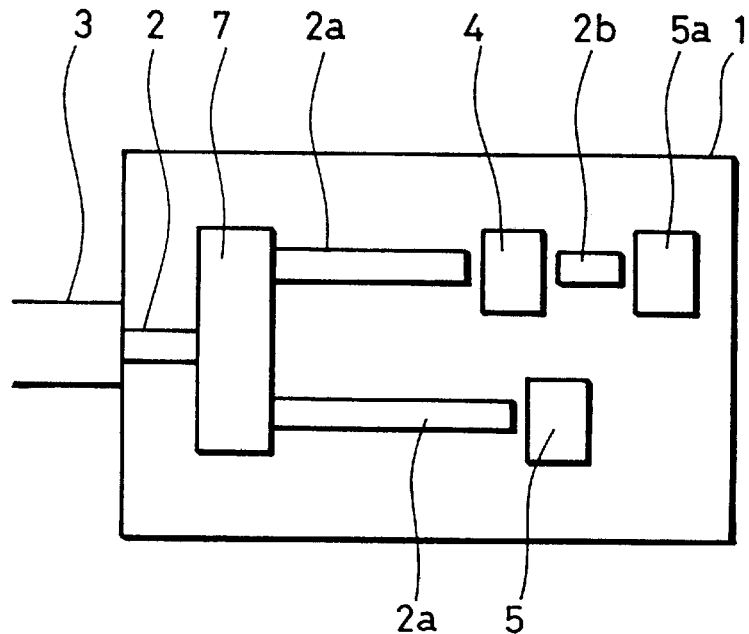
FIG. 1 is a schematic sectional plan view showing a general arrangement of a conventional optical interconnection circuit structure.
Figure 2A:
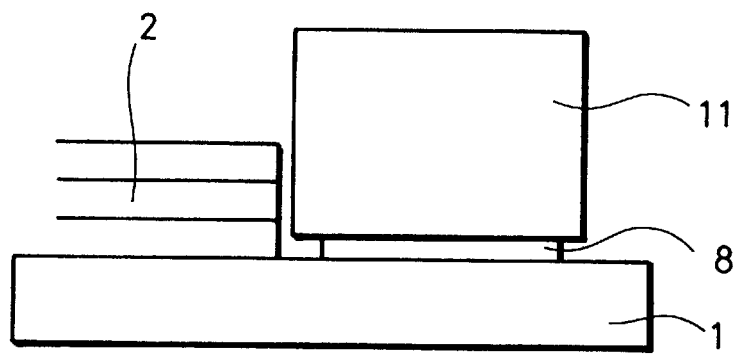
FIGS. 2A and 2B are schematic sectional views of optical interconnection circuit structures of a first embodiment according to the present invention.
Figure 2B:
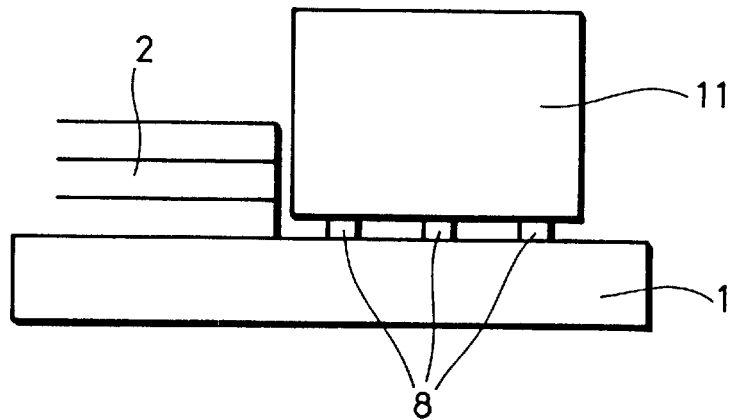

FIGS. 2A and 2B are schematic sectional views of optical interconnection circuit structures according to a first embodiment of the invention. In FIGS. 2A and 2B, a substrate 1 is made of silicon (Si) and a semiconductor light source and a semiconductor light detection device which constitute a semiconductor optical element 11 are optically coupled to an optical waveguide path 2 which is made of silica. The optical waveguide path 2 and the optical element 11 having the semiconductor light source, the semiconductor light detection device, etc. are integrated on the substrate 1. The optical element 11 having the semiconductor light source, the semiconductor light detection device, etc. is mounted on and secured to a supporting base 8. The supporting base 8 is formed at a height which permits the optical waveguide path 2 to coincide in height with an optical axis of the semiconductor optical element 11. Therefore, the height alignment of the semiconductor optical element 11 with respect to the optical axis is achieved by merely placing the semiconductor optical element 11 on the supporting base 8. The only remaining alignment required is the adjustment of the optical axis within a horizontal plane of the substrate 1 and, with this, highly efficient interconnection in the fabrication processes is achieved. The supporting base 8 is formed in the desired manner by depositing materials such as dielectrics, metals and semiconductors and the like on the substrate 1 using processes such as sputtering and CVD (chemical vapor deposition) processes and lithographic processes with dry etching processes such as reactive ion etching (RIE), ion beam etching and reactive ion beam etching (RIBE) or wet etching processes such as processes using chemicals. Alternatively, a film of materials such as dielectrics, metals and semiconductors having the desired size and height may be bonded onto the substrate 1.

FIG. 2A shows an example wherein the supporting base 8 is constituted by a single base member, and FIG. 2B shows an example wherein the supporting base is constituted by a plurality of base members 8. The effects achieved from these two different arrangements are the same. The shapes of the supporting base 8 may be any of those including rectangular, cubic, cylindrical, conical, truncated conical, and truncated triangular or square pyramid. The height of the supporting base 8 may be chosen simply by the alignment with respect to the optical axis of the semiconductor light source 4 and the semiconductor detecting means 5 mounted on the supporting base 8, so that the configuration of the supporting base 8 is not limited to that shown in FIGS. 2A and 2B. The substrate 1 may be constructed of semiconductor material such as silicon (Si), a dielectric material such as $LiNbO_3$ and glass, or a cell material made of, for example, aluminum nitride. The optical waveguide path 2 may employ a dielectric material such as $SiO_2$ and ZnO, an organic material such as polyimide and polysilane, or a semiconductor material such as GaAs and InP.

Figure 3A:
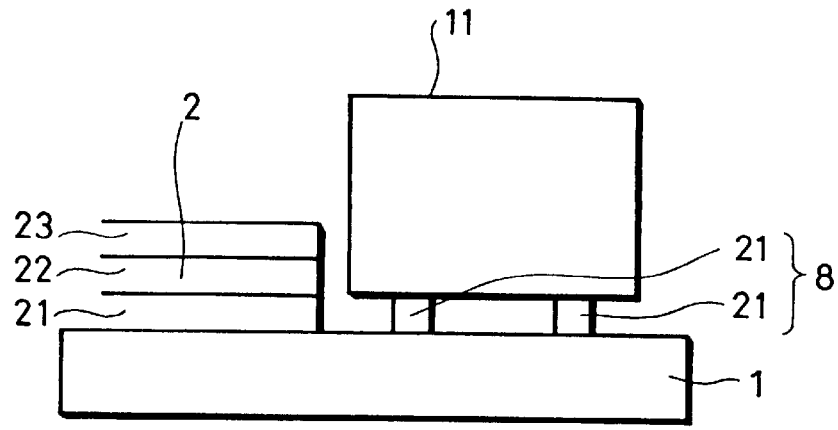
FIGS. 3A and 3B are schematic sectional views of optical interconnection circuit structures of a second embodiment according to the present invention.
Figure 3B:
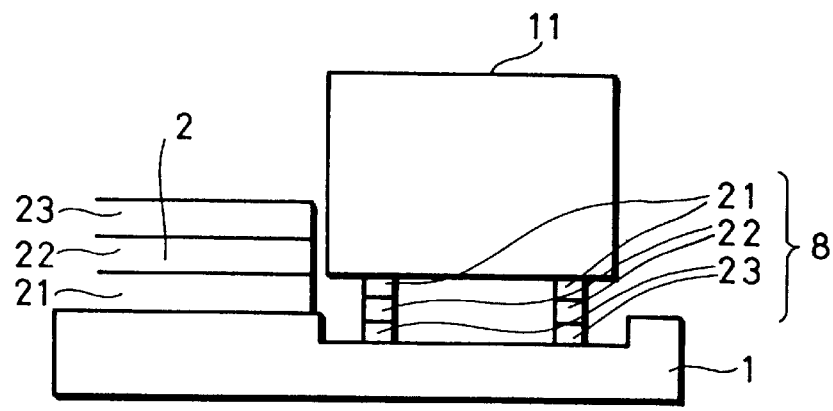

FIGS. 3A and 3B are schematic sectional views showing optical interconnection circuit structures according to a second embodiment of the invention. The supporting base 8 in this embodiment is formed by the same material as that of the optical waveguide path 2. The supporting base 8, formed at the same time as the optical waveguide 2, is deposited on the substrate 1 so that the number of fabrication steps can be reduced and greater control of the height of the supporting base can be achieved. Also, since the material used for the supporting base 8 is the same as the material used for the substrate 1, the optical waveguide path 2, and the semiconductor optical element 11 with the semiconductor light source and the semiconductor detecting device, new problems such as those caused by distortion due to differences in thermal expansion coefficients do not arise and this ensures high reliability and high production yield.

FIG. 3A shows an arrangement wherein, among the three layers deposited for the optical waveguide 2, namely, the cladding material 21, the core 22 and the second cladding material 23, the cladding material 21 which is first deposited on the substrate 1 is used for the supporting base 8.

FIG. 3B shows an arrangement wherein all the three layers, namely, the cladding material 21, the core 22 and the cladding material 23 are used for the supporting base 8. In this case, the portion of the substrate 1 at which the supporting base 8 is formed is arranged to be at a lower level than that of the portion of the substrate at which the optical waveguide path 2 is formed. The treating of the portion of the substrate 1 at which the supporting base 8 is formed employs a lithographic process with dry etching processes such as reactive ion etching (RIE), ion beam etching and reactive ion beam etching (RIBE) or wet etching processes such as processes using chemicals. The shapes of the supporting base 8 may be any of those including rectangular, cubic, cylindrical, conical, truncated conical, and truncated triangular or square pyramid. The height of the supporting base 8 may be chosen simply by the alignment with respect to the optical axis of the semiconductor light source 4 and the semiconductor detecting means 5 mounted on the supporting base 8, so that the configuration of the supporting base 8 is not limited to that shown in FIGS. 3A and 3B.

Figure 4A:
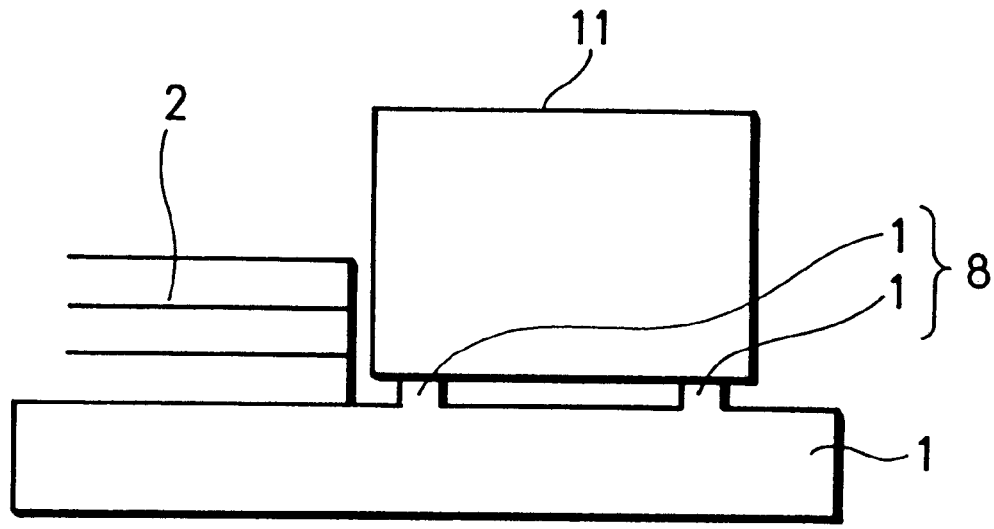
FIGS. 4A and 4B are schematic sectional views of optical interconnection circuit structures of a third embodiment according to the present invention.
Figure 4B:
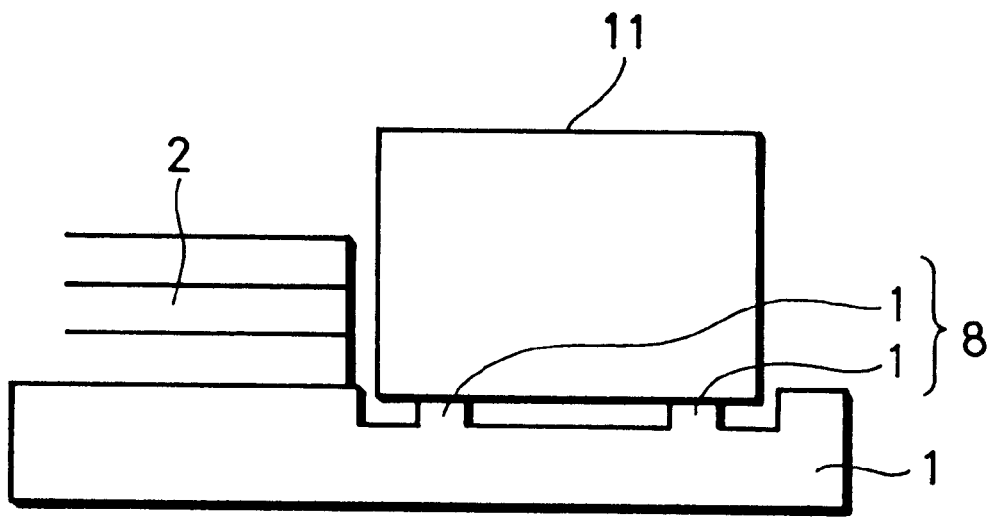

FIGS. 4A and 4B are schematic sectional views of optical interconnection circuit structures according a third embodiment of the invention. The supporting base 8 in this embodiment is formed from the same material as the substrate 1. As shown in FIG. 4A, the portions of the substrate 1 which form the supporting base 8 are elevated above the portion at which the optical waveguide path 2 is formed. Thus, the latter portion is etched in advance by using a lithographic process with dry etching processes such as reactive ion etching (RIE), ion beam etching and reactive ion beam etching (RIBE) or wet etching processes such as processes using chemicals.

Since the material used for the supporting base 8 is the same as the material used for the substrate 1, the optical waveguide path 2, and the semiconductor optical element 11 with the semiconductor light source 4 and the semiconductor detecting device 5, new problems such as those caused by distortion due to differences in thermal expansion coefficients do not arise, and this ensures high reliability and high production yield. Also, since there is no need to make a separate deposition of materials for the supporting base 8, it is possible to omit a number of the fabrication steps otherwise required.

In the arrangement shown in FIG. 4B, the portion of the substrate 1 on which the supporting base 8 is formed is lower than the level of the portion of the substrate at which the optical waveguide path 2 is formed. The shapes of the supporting base 8 may be any of those including rectangular, cubic, cylindrical, conical, truncated conical, and truncated triangular or square pyramid. The height of the supporting base 8 may be chosen simply by the alignment with respect to the optical axis of the semiconductor light source 4 and the semiconductor detecting means 5 mounted on the supporting base 8, so that the configuration of the supporting base 8 is not limited to that shown in FIGS. 4A and 4B.

Figure 5:
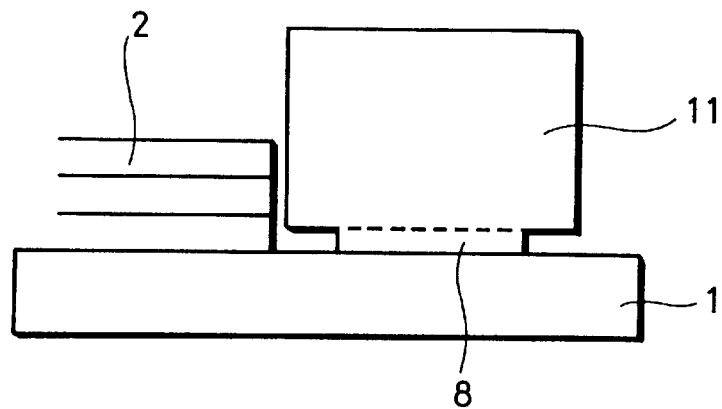
FIGS. 5 is a schematic sectional view of an optical interconnection circuit structure of a fourth embodiment according to the present invention.

FIG. 5 shows, in a schematic sectional view, an optical interconnection circuit structure according to a fourth embodiment of the invention. The supporting base 8 in this embodiment is formed from the same material as that of the semiconductor optical element 11 having the semiconductor light source and the semiconductor detecting means. In this arrangement, the supporting base 8 does not involve any new materials differing from those of the optical waveguide path 2 and the semiconductor optical element 11 with the semiconductor light source and the semiconductor detecting means, so that no new problems such as those caused by distortion due to differences in thermal expansion coefficients arise and this ensures high reliability and high production yield. Also, since the material of the semiconductor optical element including the semiconductor light source and the semiconductor detecting means can be subjected to crystal growth directly on the supporting base 8 and subsequently the semiconductor optical element can be formed by lithographic and etching processes, the structure thus formed does not require any adjustment in any directions with respect to the optical axis and this enables the number of fabrication steps to be reduced. For forming the supporting base 8, the same material as that for the semiconductor optical element 11 including the semiconductor light source 4 and the semiconductor detecting means 5 is grown by a crystal growth process. Alternatively, a film of the same material can be bonded on the substrate 1. The shapes of the supporting base 8 may be any of those including rectangular, cubic, cylindrical, conical, truncated conical, and truncated triangular or square pyramid. The height of the supporting base 8 may be determined by aligning it with respect to the optical axis of the semiconductor optical element having the semiconductor light source 4 and the semiconductor detecting means 5 mounted on the supporting base 8, so that the configuration of the supporting base 8 is not limited to that of this embodiment.

Figure 6A:
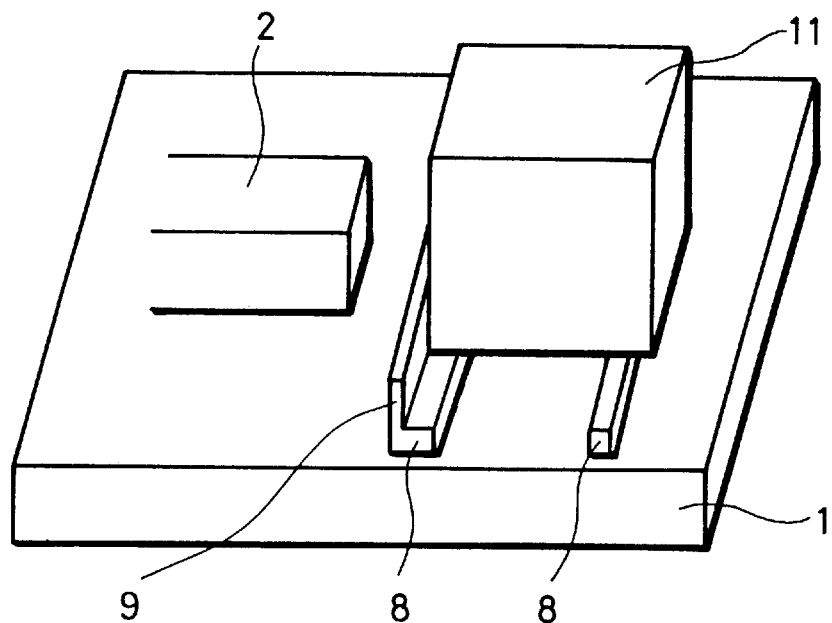
FIGS. 6A and 6B are schematic sectional views of optical interconnection circuit structures of a fifth embodiment according to the present invention.
Figure 6B:
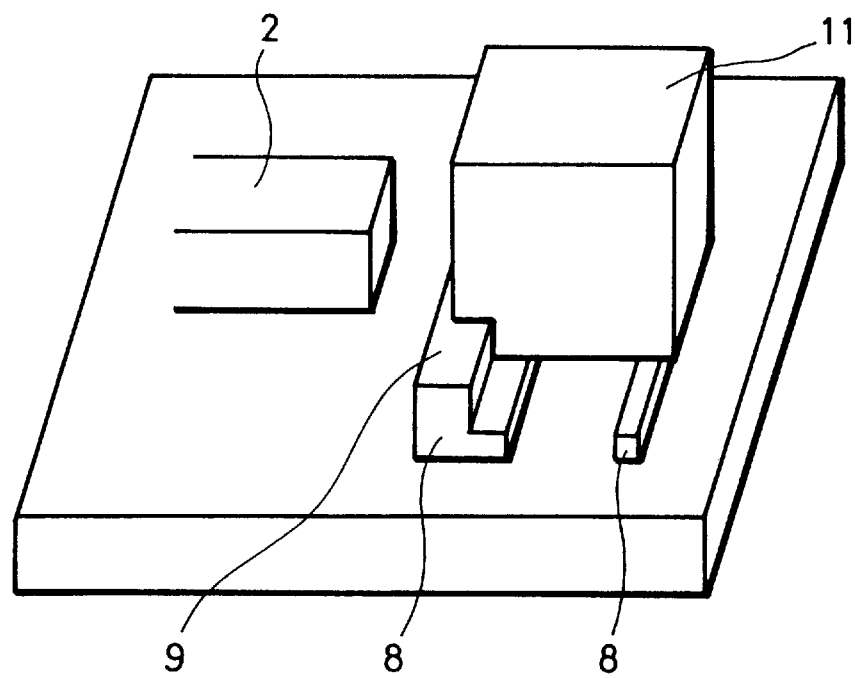

Each of FIGS. 6A and 6B shows, in a perspective view, an optical interconnection structure of a fifth embodiment according to the invention. A part of the surface of the supporting base 8 is convex thereby forming a convex portion 9. This convex portion 9 serves as a stopper when the semiconductor optical element 11 having the semiconductor light source 4 and the semiconductor detecting means 5 is fixed in place. Thus, the number of the directions in which the adjustments are made is reduced, which results in the reduction of the number of the fabrication steps otherwise required.

In the arrangement shown in FIG. 6A, the side of the semiconductor optical element 11 is in abutment with the stopper formed by the convex portion 9 and the semiconductor optical element 11 does not require any adjustment in height and axial direction.

FIG. 6B shows an arrangement wherein the stopper is formed by a convex portion 9 which stops the semiconductor optical element 11 in the direction of the optical axis and in directions vertical to the optical axis and horizontal to the surface of the substrate 1. The shapes and sizes of the convex portion 9 are not limited to those shown as they may be modified appropriately. The convex portion 9 is formed in the desired way by depositing materials such as dielectrics, metals and semiconductors on the supporting base 8 using processes such as sputtering and CVD processes and lithographic processes with dry etching processes such as reactive ion etching (RIE), ion beam etching and reactive ion beam etching (RIBE) or wet etching processes such as processes using chemicals. Alternatively, a film of materials such as dielectrics, metals and semiconductors having the desired size and height may be bonded on the substrate 1. Also, the shapes of the supporting base 8 may be any of those including rectangular, cubic, cylindrical, conical, truncated conical, and truncated triangular or square pyramid.

Figure 7:
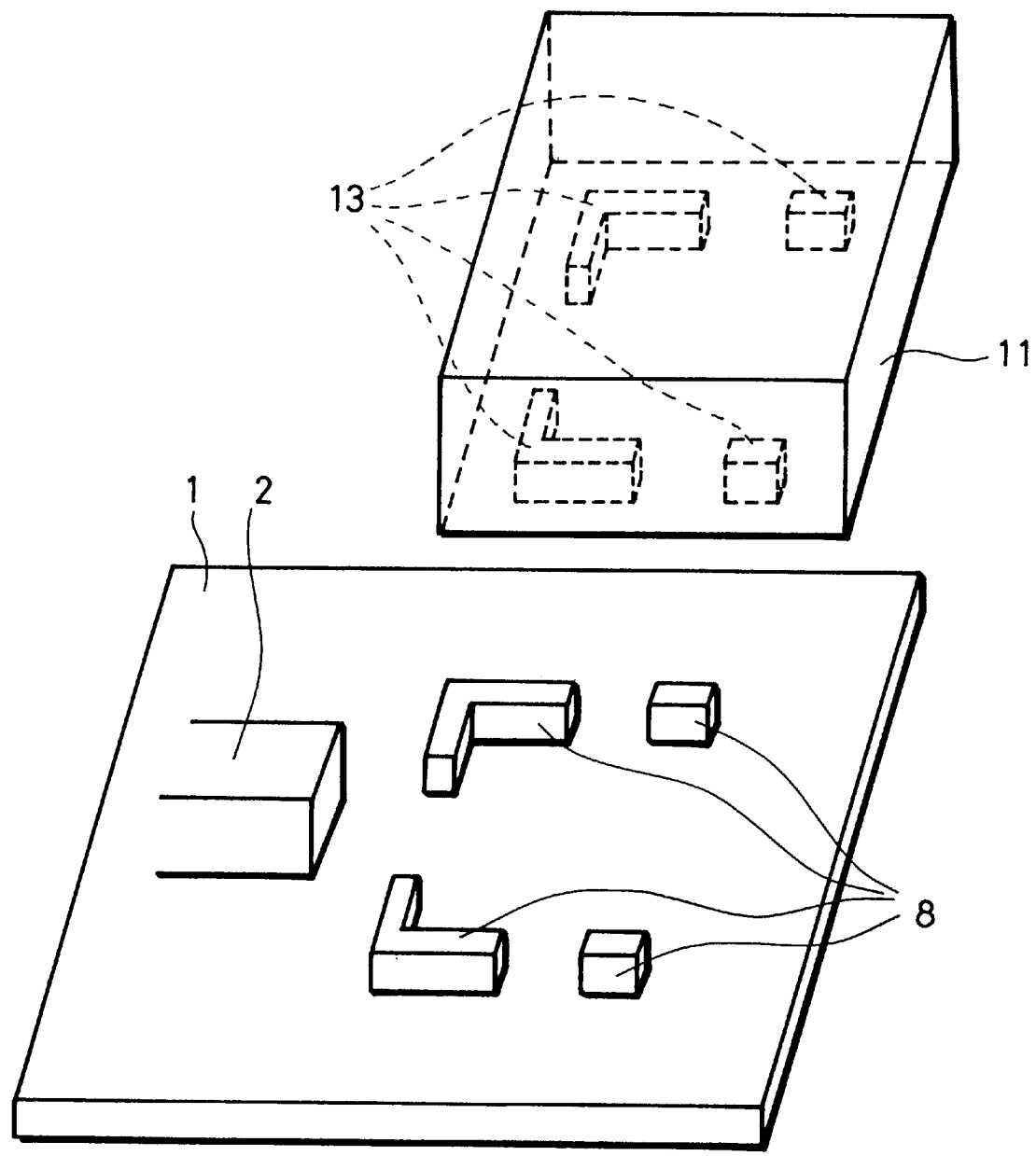
FIG. 7 is a schematic perspective view of an optical interconnection circuit structure of a sixth embodiment according to the present invention.

FIG. 7 shows a perspective view of a sixth embodiment of the optical interconnection circuit structure according to the invention. The surfaces of the semiconductor optical element 11 which abut the supporting base 8 are concave thereby forming a recessed portion 13 shaped the same as the abutting surfaces of the supporting base 8. Thus, the position of the supporting base 8 is fixed simply by having it placed on the supporting base 8. This makes it unnecessary to adjust the semiconductor optical element in the direction of the optical axis and in the directions vertical to the optical axis and horizontal to the surface of the substrate 1. It is thus possible to achieve highly efficient interconnection and to reduce the number of steps required in adjusting the semiconductor optical element with respect to the optical axis. The recessed portions 13 may be formed in the desired way by using a lithographic process with dry etching processes such as reactive ion etching (RIE), ion beam etching and reactive ion beam etching (RIBE) or wet etching processes such as processes using chemicals.

Figure 8:
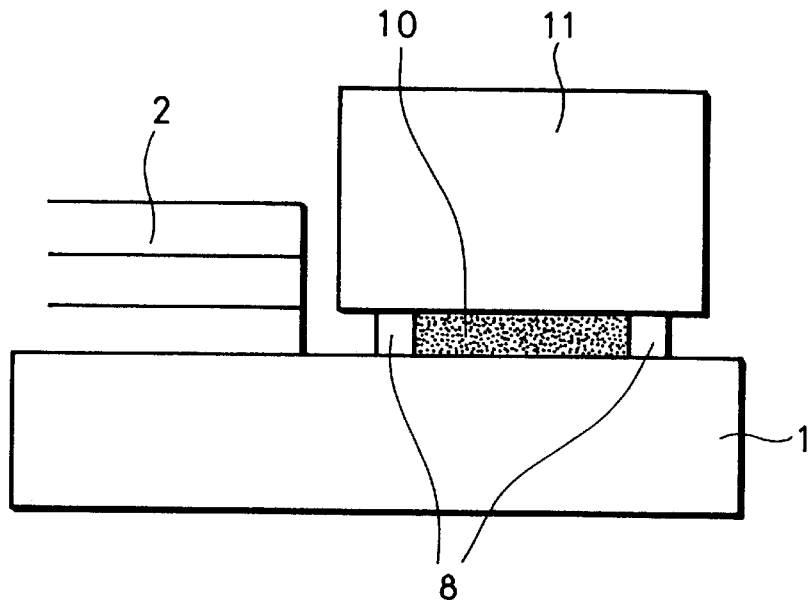
FIG. 8 is a schematic sectional view of an optical interconnection circuit structure of a seventh embodiment according to the present invention.

FIG. 8 shows a schematic sectional view of an optical interconnection structure of a seventh embodiment according to the invention. In this arrangement, the supporting base 8 is constituted by two upright members and a fixing material 10 is filled in the gap between the two upright members, so that the semiconductor optical element 11 is securely fixed on the supporting base 8. Therefore, in performing the optical coupling between the optical waveguide path 2 and the semiconductor optical element 11 which is determined by the supporting base 8, no displacement of the optical axis occurs and it is possible to fix the coupling of the semiconductor optical element 11 in a highly efficient and very reliable way. The fixing material 10 may employ, for example, solder materials such as a mixture of tin and lead, a mixture of gold and lead, or iridium; ultraviolet curing resin; thermometer resin; or thermoplastic resin. The process of filling the fixing material 10 into the gap of the supporting base 8 may take place either before or after the semiconductor optical element 11 is mounted thereon. In the case where the fixing material 10 is filled first, if the amount of such material to be filled in is made larger than the volume corresponding to the gap, the excess amount of such material will flow out of the gap due to the pressure from the semiconductor optical element 11 when it is mounted on the supporting base 8, so that the gap will be completely filled without leaving any space in the supporting base 8. This provides a highly reliable and easy fixing method with a high production yield. Where the semiconductor optical element 11 is a light emitting element, it is preferable that, for stable operation of the light emitting element, the fixing material 10 be a type of solder which dissipates heat effectively.

Figure 9A:
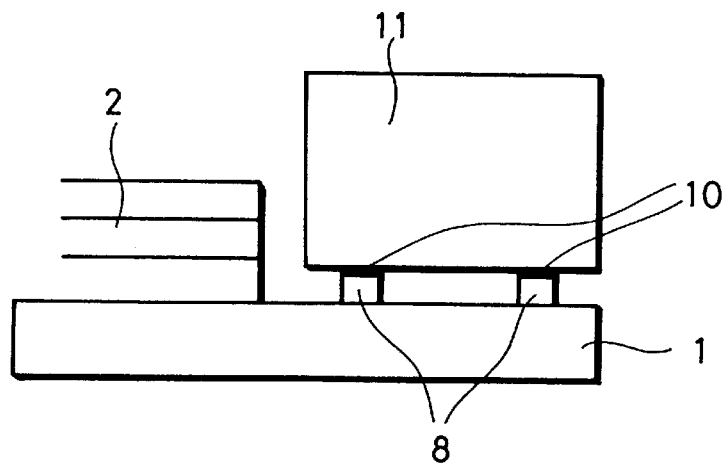
FIG. 9A is a schematic sectional view of an optical interconnection circuit structure of an eighth embodiment according to the present invention.

FIG. 9A shows a schematic sectional view of an optical interconnection circuit structure of an eighth embodiment according to the invention. In this arrangement, the semiconductor optical element 11 is fixed to the supporting base 8 with the fixing material 10 applied at contact surfaces of the upright members of the supporting base 8. The fixing material 10 may employ, for example, a solder material such as a mixture of tin and lead, a mixture of gold and lead, or iridium; ultraviolet curing resin; thermosetting resin; or thermoplastic resin. If the height of each upright member of the supporting base 8 is appropriately chosen with the thickness of each fixing material 10 taken into account, the optical axis is not displaced in optical coupling relationship between the waveguide 2 and the semiconductor optical element 11. It is therefore possible to achieve highly efficient and reliable coupling of the semiconductor optical element.

Figure 9B:
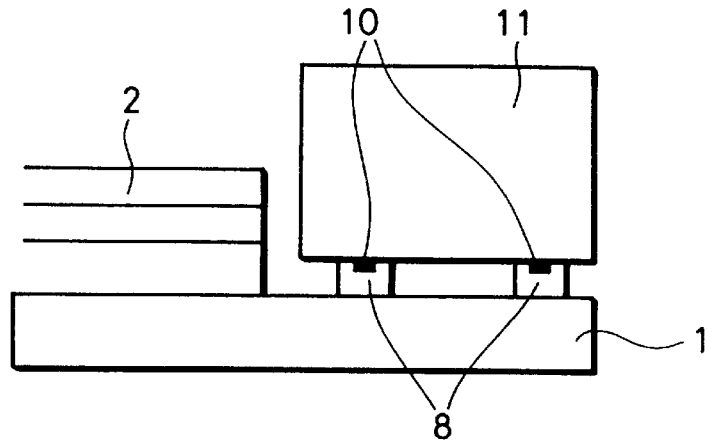
FIG. 9B is a schematic sectional view of an optical interconnection circuit structure of a ninth embodiment according to the present invention.

FIG. 9B shows a schematic sectional view of an optical interconnection structure of a ninth embodiment according to the invention. In this arrangement, each of the upright members of the supporting base 8 has a recessed portion which is filled with the fixing material 10. With respect to the optical coupling relationship fixed by the supporting base 8, there is no displacement in the optical axis and it is possible to achieve highly efficient and reliable coupling of the semiconductor optical element.

Where the optical waveguide, the semiconductor light source and the semiconductor detecting means are integrated on the same substrate thereby forming an optical interconnection circuit structure, as in the present invention, it is possible to obtain simple and highly efficient interconnection between the optical waveguide 2 and the semiconductor optical element 11. It is also possible to obtain an optical interconnection structure which is highly reliable and in which the number of fabrication steps involved is reduced, thus resulting in enhancement of the productivity of the fabrication process.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. An optical interconnection structure comprising:
   a substrate having a substantially flat upper surface;
   an optical waveguide path formed on said substantially flat upper surface of said substrate;
   a semiconductor optical element optically connected with said optical waveguide path; and
   a plurality of supporting bases of equal heights formed on said substantially flat upper surface of said substrate,
   wherein said plurality of supporting bases support said semiconductor optical element, each of said plurality of supporting bases are directly in contact with a bottom portion of said semiconductor optical element to fixedly support the same.

2. An optical interconnection structure according to claim 1, in which said supporting base is the same material as that for said optical waveguide path.

3. An optical interconnection structure according to claim 1, in which said supporting base is the same material as that for said substrate.

4. An optical interconnection structure according to claim 1, in which said supporting base is the same material as that for said semiconductor optical element.

5. An optical interconnection structure according to claim 1, in which said supporting base has upright members, each of said upright members having a concave portion at its surface and said concave portion being filled with a fixing material for fixing said semiconductor optical element to said supporting base.

6. An optical interconnection structure according to claim 1, in which said supporting base has a plurality of upright members and each of the upright members has a contact surface at which a fixing material is applied for fixing said semiconductor optical element to said supporting base.

7. An integrated optical device comprising:

a substrate having an essentially flat portion;

an optical waveguide formed on said substrate;

one or more optical element supports formed on said essentially flat portion of said substrate;

a semiconductor optical element, a first portion of a bottom surface of said semiconductor optical element resting on said one or more optical element supports; and a fixing material disposed between and contacting both a second, different portion of said bottom surface of said semiconductor optical element and said essentially flat portion of said substrate.

8. An integrated optical device as recited in claim 7, wherein said fixing material comprises a solder material.

9. An integrated optical device as recited in claim 8, wherein said solder material is a material selected from the group consisting of a mixture of tin and lead, a mixture of gold and lead, and iridium.

10. An integrated optical device as recited in claim 7, wherein said fixing material comprises a resin.

11. An integrated optical device as recited in claim 10, wherein said resin is a material selected from the group consisting of an ultraviolet curing resin, a thermosetting resin, and a thermoplastic resin.

12. An optical interconnection structure comprising:

a substrate having an upper surface;

an optical waveguide path formed on said upper surface of said substrate;

a semiconductor optical element optically connected with said optical waveguide path; and a plurality of supporting bases formed on said upper surface of said substrate, wherein said plurality of supporting bases support said semiconductor optical element, each of said plurality of supporting bases are directly in contact with a bottom portion of said semiconductor optical element to fixedly support the same, and wherein said semiconductor optical element has recessed portions being adapted to receive therein substantially the entire of said supporting bases.

13. An optical interconnection structure comprising:

a substrate having a top surface;

an optical waveguide path formed on the top surface of said substrate;

a semiconductor optical element optically connected with said optical waveguide path; and a supporting base having a plurality of upright members formed on an essentially flat portion of the top surface of said substrate and fixedly supporting said semiconductor optical element on an upper surface of said supporting base, wherein the upright members form at least one gap between said essentially flat portion of the top surface of said substrate and a bottom surface of said semiconductor optical element, said at least one gap being filled with a fixing material contacting both said bottom surface of said semiconductor optical element and said essentially flat portion of the top surface of said substrate and further contacting at least two upright members which form said at least one gap for fixedly securing said semiconductor optical element to said substrate.

14. An optical interconnection structure according to claim 13, wherein the upright members form two gaps between said essentially flat portion of the top surface of said substrate and the bottom surf ace of said semiconductor element, and wherein said fixing material comprises a solder material selected from a group consisting of tin and lead mixture, gold and lead mixture, and iridium.

* * * * *